United States Patent Office 3,140,956
Patented July 14, 1964

3,140,956
PRODUCTS AND PROCESS FOR IMPROVING PERFORMANCES OF CEMENTS, MOTARS, AND CONCRETES
Jonas Kamlet, New York, N.Y., and William Wilson Binford, Henrico County, Va., assignors to Reynolds Metals Company, Richmond, Va., a corporation of Delaware
No Drawing. Filed Oct. 26, 1959, Ser. No. 848,564
8 Claims. (Cl. 106—89)

This invention relates to a group of products and a process for improving the performances of cements, mortars and concretes. More particularly, this invention relates to a group of products and a process, the function of which is to:

(a) Accelerate the process of setting, and diminish the setting time, particularly at low temperatures;
(b) Increase the resistance to erosion; and
(c) Reduce the permeability to water, of cements, mortars and concretes, made from the various types of Portland cement, Portland blast furnace slag cements, pozzolana cements and Portland-pozzolana cements.

The use of aqueous solutions of sodium aluminate in place of the water usually employed in the preparation of such cements, mortars and concretes, to effect the functions above summarized, has been proposed by Gratiosi and Stanculescu in Industria Construoctiilor si a Materialelor de Constructii (Rumanian Construction Industry and Construction Materials), (1956), No. 4, 242–250, by Hutter in "Investigations on Concretes and Binders," Moscow, 1955, pages 141–149, and by Mitgart and Iacub (cited by Gratiosi and Stanculescu), Stroitel'naya Promyshlennost (Building Industry), volume 32, No. 1, pages 27–30 (1954), (published in Moscow), abstracted in Chemical Abstracts, vol. 48, page 9646i (1954).

These workers employed aqueous sodium aluminate solutions of high alkalinity, i.e., with a $Na_2O/Al_2O_3$ molar ratio of 2.0 and a concentration of about 15.0%. The use of such aqueous solutions involves considerable difficulties and practical drawbacks. Such highly basic solutions must be used inasmuch as sodium aluminate solutions of lower alkalinity tend to decompose and precipitate on standing or storage, particularly when exposed to air containing carbon dioxide. From the practical point of view, the transportation of such solutions to the site where the cement, mortar or concrete is to be mixed and used, involves many problems. Accurate mixing of solids with the solution is desirable, but not often attainable without adequately trained supervision. The solutions tend to evaporate on standing, making this even more difficult. Accidental dilution of the sodium aluminate by rainwater or other contaminants, inadvertent spillage during mixing and a whole host of practical misadventures may contribute to the difficulties encountered in the practical application of this principle.

Preliminary attempts to employ solid or crystalline sodium aluminates, in the preparation of cements, mortars and concretes, have been completely unsuccessful. Solid, granular, crystalline or powdered sodium aluminates are readily preparable by the reaction of aluminum oxide with caustic soda or soda ash under a variety of conditions (e.g., Cushing and Burkhart, U.S. Patent 2,018,607 (1935); Societe Pechiney, French Patent 1,026,107; Heiser, U.S. Patent 1,930,271 (1933); British Patent 403,719 (1934); U.S. Patent 1,616,674 (1927)). However, it is quite difficult to prepare a stable, non-hygroscopic readily reactive anhydrous sodium aluminate by any of the processes of the prior art. Sodium aluminates heretofore prepared are usually hydrates containing various amounts of water (e.g., 5% to 20%). These products are extremely hygroscopic and deliquescent. It has been found entirely impractical to mix such sodium aluminate products with Portland cements, Portland blast furnace slag cements, pozzolana cements or Portland-pozzolana cements, since such mixtures will set up and harden within a relatively short time. Similarly, it has been found impractical to transport such sodium aluminate products to the site where the cement, mortar or concrete is to be mixed and used, there to be added to the mixtures at the time of preparation. The hygroscopicity of the solid sodium aluminate products and the difficulty of obtaining uniform mixing and distribution in the mix make this difficult. Finally, such solid sodium aluminates are usually much too expensive to permit them to be employed with such relatively inexpensive products as cements, mortars and concretes.

In the aluminum industry, and particularly in that part of the industry concerned with the manufacture of alumina from bauxites, clays, aluminiferous by-products and co-products, there are available several calcined or sintered products which are fairly high in sodium aluminate content. Typical examples of such calcined or sintered products containing sodium aluminate are:

(a) The sinter obtained from the soda recovery plant in the Bayer process (i.e., by the calcining of bauxite with the crystalline soda recovered in the Bayer cycle at 900°–1200° C.). A typical analysis of such a sinter is the following:

$Na_2O$ ---------- 28.53%⎫ Sodium aluminate—73.38%,
$Al_2O_3$ ---------- 44.85%⎭ $Na_2O/Al_2O_3$ ratio—1.04.
L.O.I. ---------- 1.36%.
$SiO_2$ ---------- 0.65%.
$R_2O_3$ ---------- 64.35%.
$Fe_2O_3$ ---------- 16.94%.
$TiO_2$ ---------- 2.16%.
$P_2O_5$ ---------- 0.40%.
$CO_2$ ---------- 0.81%.

(b) The sinter obtained in the so-called "combination process" wherein the red mud residue of the Bayer process is mixed with limestone and soda ash and is calcined at 1250°–1300° C. (Bureau of Mines Materials Survey on "Bauxite" (1953), pages VI–11 to VI–19; Gould, Industrial and Engineering Chemistry 37, 796–802 (1945)). A typical analysis of such a sinter is the following:

$Na_2O$ ---------- 34.69%⎫ Sodium aluminate—80.60%,
$Al_2O_3$ ---------- 45.91%⎭ $Na_2O/Al_2O_3$ ratio—1.245.
L.O.I. ---------- 0.64%.
$SiO_2$ ---------- 0.60%.
$R_2O_3$ ---------- 64.28%.
$Fe_2O_3$ ---------- 16.04%.
$TiO_2$ ---------- 2.00%.
$P_2O_5$ ---------- 0.33%.

(c) The sinter obtained in the so-called "Lime-Soda Sinter Process" wherein bauxite, kaolin or clay is mixed with limestone and soda ash and is calcined at 1100°–1250° C. (Bureau of Mines Report of Investigations 4069 (May 1947)—"Recovery of Alumina From Kaolin by the Lime Sinter Process"; Bureau of Mines, Report of Investigations 4299 (June 1948)—"Extraction of Alumina From High-Iron Bauxites; Pilot-Plant Tests Employing the Lime-Sinter Process." Collett, German Patent 377,664 (1923); Mueller, German Patent 12,947 (1881); Burkey, U.S. Patent 1,151,498 (1915); Kayser, U.S. Patent 708,561 (1902); Packard, British Patent 20,220 (1902); Rody, U.S. Patents 1,285,796 (1918) and 1,495,498 (1924); Martin, U.S. Patent 1,394,854 (1921); Sherwin, U.S. Patent 1,422,004 (1922); Cowles, U.S. Patents 1,508,777 (1924), 1,514,657 (1924), 1,591,364–5 (1926)). Such calcines or sinters usually contain sodium aluminates of $Na_2O/Al_2O_3$ ratios between 0.88 and 1.60. A typical analysis of such a sinter is the following:

| | |
|---|---|
| $Na_2O$ | 11.9% ⎱ Sodium aluminate—28.3%, |
| $Al_2O_3$ | 16.4% ⎰ $Na_2O/Al_2O_3$ ratio—1.20. |
| $SiO_2$ | 24.0%. |
| $Fe_2O_3$ | 0.91%. |
| $TiO_2$ | 0.82%. |
| CaO | 39.4%. |
| MgO | 0.67%. |

(d) The sinter obtained in the Peniakoff process wherein bauxite, kaolin or clay is mixed with sodium sulfate, a carbonaceous reducing agent and (optionally) limestone and is calcined at 1100°–1200° C. (Peniakoff, British Patent 14,707 (1908), French Patent 396,584 (1909), German Patent 247,763 (1912); Projahn, U.S. Patent 684,864 (1901), German Patent 112,173 (1900), British Patent 6,790 (1899); Edwards, Frary and Jeffries—Aluminum and its Production—vol. I (McGraw-Hill, 1930), pages 147–152).

(e) The sinter obtained by mixing the desilication product from the Bayer process with limestone and calcining at 1100°–1250° C. This desilication product is largely a natrolith-like precipitate obtained in the desilication of sodium aluminate solutions in the Bayer process. A typical desilication product analyzes: $Na_2O$—21.74%, $Al_2O_3$—30.21%, $SiO_2$—31.35%, CaO—1.28%, $Fe_2O_3$—1.36%, $TiO_2$—0.32%, $SO_3$—5.90%. On calcining this natrolith-like desilication residue with limestone, a sinter of the following typical analysis is obtained:

| | |
|---|---|
| $Na_2O$ | 14.60% ⎱ Sodium aluminate—34.89%, |
| $Al_2O_3$ | 20.29% ⎰ $Na_2O/Al_2O_3$ ratio—1.18. |
| $SiO_2$ | 21.06%. |
| CaO | 38.95%. |
| $Fe_2O_3$ | 0.09%. |
| $SO_3$ | 3.26%. |

(f) The sinter obtained by the mixing of an iron-containing aluminum ore (such as ferruginous Hawaiian bauxite ore) with soda ash, limestone and a carbonaceous reducing agent (such as coke), and calcining the mixture at temperatures of 800° C. to 1200° C., as is described in the co-pending patent application Serial No. 759,289, filed September 5, 1958, now U.S. Patent No. 2,964,383. The sinter obtained by this process has the following typical analysis:

| | |
|---|---|
| $Na_2O$ | 16.02% ⎱ Sodium aluminate—41.10%, |
| $Al_2O_3$ | 25.08% ⎰ $Na_2O/Al_2O_3$ ratio—1.05. |
| $SiO_2$ | 9.58%. |
| Fe | 14.12%. |
| $Fe_2O_3$ | 8.61%. |
| $TiO_2$ | 4.08%. |
| $Na_2SO_4$ | 0.17%. |
| CaO | 20.75%. |

The basis of this invention is the finding that these sodium aluminate-containing sinters or calcines (the terms being here used interchangeably) are ideally suited for use in the present invention. The sinters may be alternatively:

(a) Ground together with the clinker of the Portland cement, Portland blast furnace slag cements, pozzolana cements or Portland-pozzolana cements, to make a uniform, unitary product suitable for use in all cement, mortar and concrete uses; or (b) Ground to cement fineness and admixed with such cements in the process of preparing and using such cements, mortars and concretes at the site of said use or application.

The use of such sodium aluminate-containing sinters in this manner has the following advantages:

(a) Unlike sodium aluminates made by the processes of the prior art, these sinters are not excessively hygroscopic. They may be ground to cement fineness and admixed with said cement, to give products which may be bagged, stored and shipped. In the amounts employed, and in admixture with said cements, these additives do not adversely affect the stability, storageability, shipability or utility of said cements. When ground to cement fineness and intended to be employed at the site of cement preparation and use, these sinters are stable, remain free-flowing, may be bagged, stored and shipped without difficulty. The presence of the other components in said sintered or calcined sodium aluminate-containing products seems to protect these products to a considerable extent from deliquescence and hygroscopicity.

(b) The other components of said sinters (i.e., the calcium silicates, calcium ferrites, silica, iron oxide, calcium titanates) seem to improve the performance of the cements, mortars and concretes with which they are incorporated.

(c) From the commercial point of view, the sodium aluminates present in said sinters or calcines are considerably less expensive, and have intrinsically a lower value, than the sodium aluminates (either solid, granular, crystalline or liquid products) made from purified alumina and caustic soda and heretofore employed in cements, mortars and concretes.

The products suitable for use in the process of this invention may therefore be categorized as sinters containing sodium aluminates and calcium silicates derived by the calcining of aluminiferous raw materials with sodium compounds and calcium compounds at advanced temperatures. Such aluminiferous raw materials include bauxite, kaolin, clay, aluminiferous minerals and ores, laterites, red mud from the Bayer process and the desilication residue from the Bayer process.

Such sinters or calcines, when used in the manner above described, i.e., admixed with the cement during its manufacture or grinding, or added to the cement, mortar or concrete at the time of and at the site of its use, effect the desired purposes of this invention, viz.:

(a) They accelerate the setting and diminish the setting time;

(b) They increase resistance to erosion, and (c) They reduce the permeability to water of said cements, mortars and concretes.

The amount of such calcines or sinters used in the process of this invention may vary widely. As a rule, an amount of calcine or sinter containing from 2% to 20% of sodium aluminate, based on the weight of the cement, may be employed. A preferred range would be an amount of sinter containing 7.5% to 12.5% of sodium aluminate, based on the weight of the cement.

The products and the process of this invention are particularly suitable for use during the winter, or under climatic conditions which normally delay or retard the setting of cements, mortars or concretes and therefore prevent construction, especially of massive concrete structures. They are also especially suited for use with constructions in the presence of excessive moisture or water flow, such as dams, breakwaters, quays, tunnels, foundations below the water table, retaining walls, inflow galleries, water conduits, aqueducts, sewage constructions, et cetera.

The following examples are given to define and to illustrate this invention but in no way are intended to limit it to reagents, proportions or conditions described therein. Obvious improvements and modifications will occur to any persons skilled in the art.

Example I

To simulate conditions obtaining during cold weather, the setting times of Portland cement pastes were determined at 35° F., with and without the addition of various amounts of sodium aluminate sinters.

| Sinter added | Percent Sodium aluminate in Sinter | Initial set | Final set |
|---|---|---|---|
| None | | 5 hrs. 30 min. | 10 hrs. 30 min. |
| A | 2.5 | 4 hrs. 15 min. | 9 hrs. |
| A | 5.0 | 3 hrs. 5 min. | 8 hrs. |
| A | 7.5 | 2 hrs. 5 min. | 5 hrs. 15 min. |
| A | 10.0 | 1 hr. 30 min. | 3 hrs. 30 min. |
| A | 12.5 | 1 hr. 5 min. | 2 hrs. 30 min. |
| A | 15.0 | 1 hr. | 2 hrs. 15 min. |
| A | 20.0 | 1 hr. | 2 hrs. |
| C | 5.0 | 3 hrs. 30 min. | 8 hrs. 15 min. |
| C | 7.5 | 2 hrs. 15 min. | 5 hrs. 5 min. |
| C | 15.0 | 1 hr. 30 min. | 2 hrs. 30 min. |
| C | 20.0 | 1 hr. 15 min. | 2 hrs. 5 min. |
| F | 5.0 | 3 hrs. 45 min. | 8 hrs. 45 min. |
| F | 7.5 | 2 hrs. 30 min. | 5 hrs. |
| F | 15.0 | 1 hr. 30 min. | 2 hrs. 35 min. |
| F | 20.0 | 1 hr. 30 min. | 2 hrs. 15 min. |

Similar accelerations of setting times are obtained at this low temperature with sinters B, D and E. The results obtained were substantially the same when the sinter was ground to cement fineness together with the Portland cement and the mixture used as a unitary product, and when the ground sinter was added to the cement at the time when the cement paste was prepared. Similar accelerations of setting times were obtained with the use of these sinters in conjunction with Portland blast furnace slag cements, pozzolana cements and Portland-pozzolana cements. The setting times of these cement pastes were determined by the ASTM Method C191–52.

Example II

The following setting times of various mortars at room temperature (77° F.), using a mortar (1:1 with Ottawa sand) were noted with and without the addition of the sodium aluminate sinters to the Portland cement.

| Sinter added | Percent Sodium aluminate in sinter on weight of cement | Setting time, minutes Beginning | End |
|---|---|---|---|
| None | | 30 | 45 |
| A | 2.5 | 24 | 40 |
| A | 5.0 | 22 | 38 |
| A | 7.5 | 20 | 32 |
| A | 10.0 | 18 | 30 |
| A | 12.5 | 17 | 29 |
| A | 15.0 | 15 | 25 |
| A | 20.0 | 15 | 22 |
| B | 7.5 | 22 | 30 |
| B | 15.0 | 16 | 26 |
| C | 5.0 | 24 | 38 |
| C | 7.5 | 20 | 31 |
| C | 15.0 | 15 | 26 |
| C | 20.0 | 15 | 24 |
| D | 5.0 | 22 | 37 |
| D | 7.5 | 21 | 31 |
| E | 7.5 | 20 | 30 |
| E | 15.0 | 16 | 25 |
| F | 5.0 | 24 | 31 |
| F | 7.5 | 21 | 30 |
| F | 15.0 | 15 | 24 |
| F | 20.0 | 14 | 21 |

The results were substantially the same with the sinter ground together with the cement, and with the ground cement added to the cement at the time the mortar is prepared. Similar results are obtained with the use of these sinters in conjunction with Portland blast furnace slag cements, pozzolana cements and Portland-pozzolana cements.

Example III

The 14 day and 28 day compressive strengths of a Type I Portland cement concretes containing varying amounts of sodium aluminate sinters were determined to be as follows:

| Sinter added | Percent sodium aluminate in sinter on weight of cement | 14 day strength, p.s.i. | 28 day strength, p.s.i. |
|---|---|---|---|
| None | | 3,750 | 4,250 |
| A | 2.5 | 3,350 | 4,000 |
| A | 5.0 | 3,550 | 4,150 |
| A | 7.5 | 3,800 | 4,250 |
| A | 10.0 | 3,850 | 4,500 |
| A | 12.5 | 3,750 | 4,400 |
| A | 15.0 | 3,500 | 4,200 |
| A | 20.0 | 3,450 | 4,150 |
| C | 7.5 | 3,750 | 4,200 |
| C | 15.0 | 3,800 | 4,150 |
| F | 7.5 | 3,450 | 4,250 |
| F | 15.0 | 3,650 | 4,200 |

These tests were made on 6 x 12 inch cylinders, cured at 75° F. for ages shown, with concrete made at the rate of 6 sacks of cement per cubic yard.

These tests indicate that the addition of the sodium aluminate-containing sinters do not materially diminish the compresive strengths of the cements and concretes so treated.

Example IV

To test the erosion of mortars prepared with and without the addition of sodium aluminate sinters, and the permeability of these mortars to water, the relation between the coefficient of permeability and the sodium aluminate content of the sinter added was determined, as follows

| Sinter added | Percent Sodium aluminate in sinter on weight of cement in mortar | Cofficient of Permeability $Kq \times 10^4$ |
|---|---|---|
| A | 5.0 | 70 |
| A | 7.5 | 78 |
| A | 10.0 | 90 |
| A | 15.0 | 80 |
| C | 7.5 | 80 |
| C | 15.0 | 82 |
| F | 7.5 | 74 |
| F | 15.0 | 80 |
| None | | 28 |

It will thus be noted that the addition of the sodium aluminate containing sinters very greatly increases the resistance to erosion by water and diminishes the permeability by water of cements, concretes and mortars made with such additions. $Kq$ is a relative measure of the flow of water thru a concrete or mortar per square foot for a unit hydraulic gradient (U.S. Dept. of Interior, Concrete Manual (1956)). An increase in the coefficient of permeability indicates a decrease in the erosion of the concrete or mortar by water and an increase resistance to permeability by water.

The results obtained were substantially the same when the sinter was ground together with the cement and the product used as a unitary cement, or when the sinter was added to the cement at the time and place of use. Similar results were obtained with the use of sinters B, D and E and with Portland blast furnace slag cements, pozzolana cements and Portland-pozzolana cements.

Having described our invention, what we claim and desire to protect by Letters Patent is:

1. Cements, mortars and concretes having as a basis a member of the group consisting of Portland cement, Portland blast furnace slag cement, pozzolana cement, and Portland-pozzolana cement, having admixed therewith from about 2% to about 20% based on the weight of the cement, of a substantially nonhydroscopic aluminous sinter consisting essentially of sodium aluminate having a molar ratio of $Na_2O:Al_2O_3$ between about 0.88 and about 1.60 in association with oxides of iron, silicon, and calcium, said sinter containing between about 28% and about 81% by weight of sodium aluminate and being stable and free-flowing.

2. Process for improving the performance of cements, mortars, and concretes having as a basis a member of the group consisting of Portland cement, Portland blast furnace slag cement, pozzolana cement, and Portland-pozzolana cement with respect to acceleration of setting time, resistance to water erosion, permeability, and compressive strength, which comprises admixing therewith an amount equivalent to from about 2% to about 20% based on the weight of the cement, of a substantially nonhygroscopic aluminous sinter consisting essentially of sodium aluminate having a molar ratio of $Na_2O:Al_2O_3$ between about 0.88 and about 1.60 in association with oxides of iron, silicon and calcium, said sinter containing between about 28% and about 81% of sodium aluminate and being stable and free-flowing.

3. The process of claim 2 in which the amount of admixed sinter is between about 7.5% and about 12.5%.

4. The composition of claim 1 in which the aluminous sinter is bauxite sintered with soda ash.

5. The composition of claim 1 in which the aluminous sinter is Bayer process red mud sintered with soda ash and lime-stone.

6. The composition of claim 1 in which the aluminous sinter is kaolin sintered with soda ash and limestone.

7. The composition of claim 1 in which the aluminous sinter is bauxite sintered with sodium sulfate, and a carbon containing reducing agent.

8. The composition of claim 1 in which the aluminous sinter is Bayer process desilication residue sintered with limestone.

References Cited in the file of this patent

UNITED STATES PATENTS

| | | |
|---|---|---|
| 903,019 | Spackman | Nov. 3, 1908 |
| 1,716,527 | Martin | June 11, 1929 |
| 2,099,176 | Scripture | Nov. 16, 1937 |
| 2,242,258 | Noll | May 20, 1941 |
| 2,250,186 | Noll | July 22, 1941 |
| 2,793,128 | Emhiser | May 21, 1957 |
| 2,880,096 | Hurley | Mar. 31, 1959 |
| 2,899,326 | Butler | Aug. 11, 1959 |

FOREIGN PATENTS

| | | |
|---|---|---|
| 632,164 | Great Britain | Nov. 17, 1949 |
| 521,428 | Belgium | July 31, 1953 |

OTHER REFERENCES

Serial No. 391,006, Dyckerhoff et al. (A.P.C.), published May 11, 1943.

Chemical Abstracts, volume 48 (1954), page 9446i.

A. V. Hussey: Chem. and Ind., 1947 (42), 635.

F. M. Lea and C. H. Desch: The Chemistry of Cement and Concrete, Edward Arnold, London 1953, page 428.